Sept. 13, 1932.  S. PEARCE  1,877,042
MACHINE FOR AND METHOD OF BANDING PACKAGES
Filed Oct. 11, 1929  7 Sheets-Sheet 1

Fig. 1

Inventor
Sidney Pearce
By Caswell & Lagaard
Attorneys

Sept. 13, 1932.   S. PEARCE   1,877,042
MACHINE FOR AND METHOD OF BANDING PACKAGES
Filed Oct. 11, 1929   7 Sheets-Sheet 2

Fig. 2

Inventor
Sidney Pearce
By Caswell & Lagard
Attorneys

Sept. 13, 1932.   S. PEARCE   1,877,042
MACHINE FOR AND METHOD OF BANDING PACKAGES
Filed Oct. 11, 1929   7 Sheets-Sheet 6

Inventor
Sidney Pearce
By Caswell & Lagaard
Attorneys

Patented Sept. 13, 1932

1,877,042

UNITED STATES PATENT OFFICE

SIDNEY PEARCE, OF MINNEAPOLIS, MINNESOTA, ASSIGNOR TO J. N. COLLINS COMPANY, OF MINNEAPOLIS, MINNESOTA, A CORPORATION OF DELAWARE

MACHINE FOR AND METHOD OF BANDING PACKAGES

Application filed October 11, 1929. Serial No. 398,908.

My invention relates to a machine for and method of banding packages, and has for an object to provide a device whereby gummed bands may be quickly, accurately and positively applied to the packages on which they are to be used.

Another object of the invention resides in providing a device, the operation of which in applying a band to a package involves the movement of the package.

Another object of the invention is to provide for the movement of the packages in a manner to retain their contents, such movement including a movement of the packages, in train, whereby the contents of the packages are maintained seated therein and particularly during the application and sealing of the bands to the packages.

A further object of the invention resides in providing guides for directing unbanded packages in a feeding train toward a banding mechanism and for directing banded packages in a discharging train from said mechanism.

A still further object of the invention resides in providing at the head of the guide for the feeding train a stop and a plunger movable at right angles to said stop to transfer the packages one by one therefrom.

Another object of the invention resides in providing driving means continuously operable to move the unbanded packages toward said stop.

Another object of the invention resides in providing a pair of spaced wheels for peripherally receiving bands and for supporting, gumming and positioning the same, said plunger being adapted to move a package from said stop and into position between said wheels adjacent the positioned band thereon.

A still further object of the invention resides in providing a plunger movable between said wheels for moving a package disposed therebetween against a positioned band.

A feature of the invention resides in disposing the guide for the discharging train of banded packages so as to receive the package moved against the positioned band and away from the banding mechanism.

An object of the invention resides in forming said last named guide with members for engaging the gummed ends of the bands to turn them upon and press them against the packages.

A still further object of the invention resides in providing gumming means for applying an adhesive to the peripheries of the banding wheels, and in constructing the bands from a ribbon of paper which are severed transversely of the ribbon and deposited, one at a time, upon the gummed surfaces of the said wheels.

An object of the invention resides in presenting a band to the wheels at their upper portions and in thereafter rotating the wheels to position the band in proximity to the package to be banded.

A still further object of the invention resides in feeding the ribbon toward the wheels in such fashion that the leading portion of the ribbon engages the previously severed band in a manner causing that band to be brushed against the gummed surfaces of the wheels when they are subsequently turned and causing said leading portion of said ribbon to lie in contact with the wheels at the time of its severance to provide the succeeding band.

With the foregoing and other objects in view, which will appear in the following description, the invention resides in the novel combination and arrangement of parts and in the details of construction hereinafter described and claimed.

In the drawings:

Fig. 4 is a fragmentary elevational view of the machine viewed from the opposite side from which Fig. 1 is taken.

In the handling of packages, particularly packages of candy, where a number of individually wrapped pieces are placed in open containers, considerable difficulty is encountered due to the fact that the contents may be spilled from the containers. This is particularly true where an open display package is employed and which is constructed with low sides, the better to expose and display the contents of the package. For the purpose of retaining the contents within such a package the use of a small band is employed, the band being applied across the edges of the exposed portions of the contained pieces and sealed at its extremities to the ends of the container. The instant invention embodies a device and method whereby such bands may be expeditiously and inexpensively applied to packages of the nature particularly noted above and to other packages as well.

Figures 5, 11:
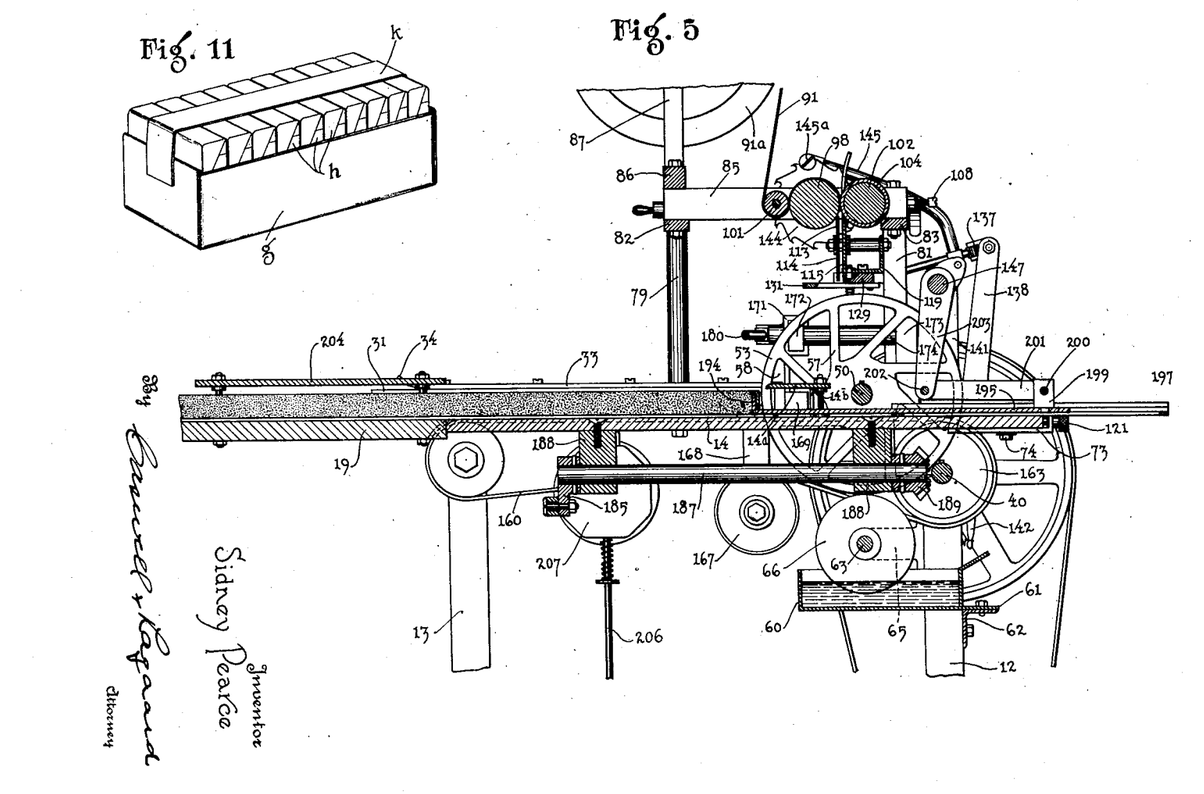
Fig. 5 is a longitudinal sectional view viewed from the same direction as Fig. 1, and taken as on the line 5—5 of Figs. 2 and 3.
Fig. 11 is a perspective view of a package banded, as by means of a machine embodying my present invention.

A package of such nature is illustrated in Fig. 11, the same comprising a shallow container $g$, sometimes termed tray or boat. Thin squares of wrapped candy, as at $h$, placed on edge within the container $g$, stand with portions projecting from the container, parts thereof being exposed at the top, sides and ends of the container. In the banding of a package of this particular description, a strip or band of paper, as at $k$, is placed across the outer face of the block of candy pieces $h$ and fastened at its extremities to the ends of the container $g$, as shown.

The machine shown, as being illustrative of an embodiment of my invention includes a frame structure A (Fig. 1) upon which the various operating parts are mounted. This frame structure includes four legs 10, 11, 12 and 13 which are bolted to a table 14 through bolts 15. The lower portions of the legs are braced by means of two longitudinal rods 16, the ends of which are turned down and threaded and extend through the said legs and are securely attached thereto by nuts 17. The legs 10 and 13 are further braced by a rod 18 identical in construction to that of the rod 16. All of the various parts of the machine are carried by said table 14, legs 10, 11, 12 and 13 and braces, the same in assembly forming the frame structure A of the machine proper.

In addition to the table 14 is an auxiliary table 19 which is attached at one end to the legs 10 and 13 by means of clip angles 20. This table is further supported at its opposite ends by means of auxiliary legs 21 attached to a cleat 22 extending beneath the underside of the said auxiliary table.

Along the auxiliary table 19 and along the adjoining portion of the table 14 are two guideways indicated in their entireties at 23 and 24 (Fig. 3), the former serving to lead packages to be banded toward the banding mechanism and the latter serving to lead banded packages away from said mechanism as will be later explained in detail. The guideway 23 consists primarily of two angles 25 and 26 directly secured to the surface of the auxiliary table 19 a distance apart equal to the length of the packages to be banded, such packages being introduced to said guideway 23, on their sides, with their ends to said angles 25 and 26 and with the projecting candy pieces in each package abutting against the bottom of the preceding package. The two angles 25 and 26 terminate short of the table 14. From this point on, the said guideway 23 consists of a larger angle 31 and a bar 32 secured to the table 14 in alignment with the inner faces of the two angles 25 and 26. To the bar 32 is a marginally secured leaf 33 which projects above that portion of the guideway 23 between angle 31 and bar 32 and prevents the packages from climbing therein. The extreme forward end 34 of this leaf 33 is upturned to permit of the ready entry of the packages therebeneath. At a position spaced beyond the end of the guide 23 a distance equal to the height of a package is a stop 35 (Figs. 4 and 6), which is formed with a flange 36 bolted to the top of the table 14. This stop 35 is formed with an overlying portion 37 which constitutes a continuation of the holddown leaf 33 and serves to maintain control of the packages during the feeding of the same to the band applying mechanism.

For the purpose of operating the various rotating and movable parts of the machine, I employ a jack shaft 40 (Fig. 1) which is journalled in bearings formed in the upper portions of the legs 11 and 12. This jack shaft is driven from a counter-shaft 38 similarly journalled in bearings formed in the lower portions of said legs, through a belt 39, which passes over a pulley 41 fast on the shaft 40 and another pulley 42 fast on the counter-shaft 38. The counter-shaft 38 is driven from an electric motor 43 through a belt 44 which passes over a pulley 45 fast on the counter-shaft 38 and over another pulley 46 fast on the motor shaft 47. The motor 43 is mounted on two bars 48 and 49 attached to the frame members 16 by clips 51. Through this mechanism, the shaft 40 may be driven at a moderate rate of speed from the motor 43 which may be of the usual construction and design.

Figure 3:
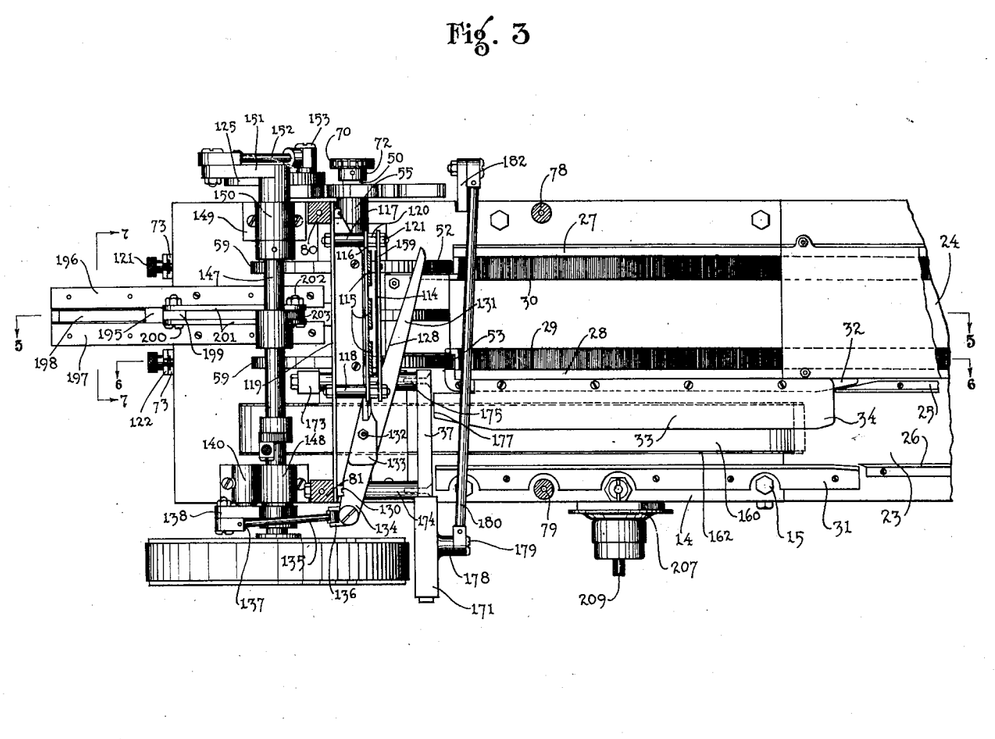
Fig. 3 is a fragmentary sectional view taken as on the lines 3—3 of Figs. 1 and 4 and also drawn to a somewhat enlarged scale.

The mechanism for applying adhesive to the bands and properly positioning them for application to the packages to be gummed is shown in Figs. 4, 5, 6, 9 and 10. This mechanism comprises primarily two spaced wheels 52 and 53 keyed to a shaft 50 extending transversely of the table 14 and immediately above the same. This shaft 50 is journalled in bearings 54 and 55 directly secured to said table and which bring the axis of the said shaft substantially in the plane of the two guideways 23 and 24. The table 14 is slotted, as at 56 (Fig. 6), to receive the lower portions of the wheels 52 and 53. These wheels 52 and 53, and particularly wheel 53, are constructed with spokes 57 which are so shaped and disposed as to leave intervening openings 58 through which a package to be banded may be inserted into the space between the said wheels. The wheels 52 and 53 are spaced apart a distance slightly greater than the length of the packages, permitting the packages to be moved outwardly from between the wheels in their lengthwise relation with respect thereto. In Fig. 3, it will be noted that the guideway 23 leads up along the side of the wheel 53, permitting the packages to be thrust endwise along table 14 from said guideway and through an opening 58 between spokes 57 and into position between the two wheels 52 and 53. It will be further noted that the guideway 24 is so disposed as to receive the packages, in train, as they are moved from between the two wheels 52 and 53.

The peripheral surfaces of wheels 52 and 53 are coated with an adhesive and the bands applied thereto are positioned by means of the said wheels so as to be readily applicable to the packages as they are moved through the machine. For this purpose, a gumming or adhesive applying device is employed, the same being best shown in Figs. 1, 2 and 5. This device comprises a receptacle 60, positioned immediately below the lower portions of the said wheels, the protruding end 61 of the bottom of the receptacle being bolted to an angle support 62 secured to the two legs 11 and 12. Immediately above this receptacle 60 is disposed a shaft 63 which is journalled in two bearings 64 and 65 attached to the legs 11 and 12. Upon this shaft are mounted two discs 66 and 67 which are arranged to contact with the peripheral surfaces of the two wheels 52 and 53 and to dip into an adhesive placed within the receptacle 60. A collar 68 on shaft 63 and a hub 69 on the disc 67 engage, respectively, the bearings 65 and 64 and hold the shaft 63 from axial movement, thus maintaining the engagement of the two discs 66, 67 with the wheels 52 and 53. The shaft 63 is driven from the shaft 50 through a chain 70 which passes over a sprocket wheel 71 mounted on the end of shaft 63 and a corresponding sprocket wheel 72 mounted on the end of the shaft 50. As the latter shaft rotates, the discs 66 and 67 are turned and thus caused to dip into the adhesive in receptacle 60 and to apply the adhesive to the peripheral surfaces of the wheels 52 and 53 with which they have rolling contact.

For the purpose of distributing the adhesive upon the peripheral surfaces of wheels 52 and 53, a pair of distributing plates or blades 73 (Figs. 7 and 8) are employed. These plates are adjustably secured beneath the under side of the table 14, through bolts 74 threaded into the table and received by slots 75 formed in the said blades. These plates are each constructed with engaging edges 76 which engage the peripheral surfaces of the wheels 52 and 53, and spread the adhesive uniformly thereon, wiping off into the receptacle 60 any surplus adhesive. In order to adjust the edges 76 of the distributing blades 73 with respect to the wheels 52 and 53, adjusting screws 121 are employed, the same being mounted to turn, but not slide, in ears 122 formed on the ends of said blades. These screws 121 are threaded into the table 14 and serve, when turned, to move said blades 73 toward and from the wheels 52 and 53, bolts 74, of course, being loosened at the time. In this manner, the adhesive may be applied to the surfaces of the wheels 52 and 53 so as to permit of properly gumming the bands to be applied to the packages.

Figure 1:
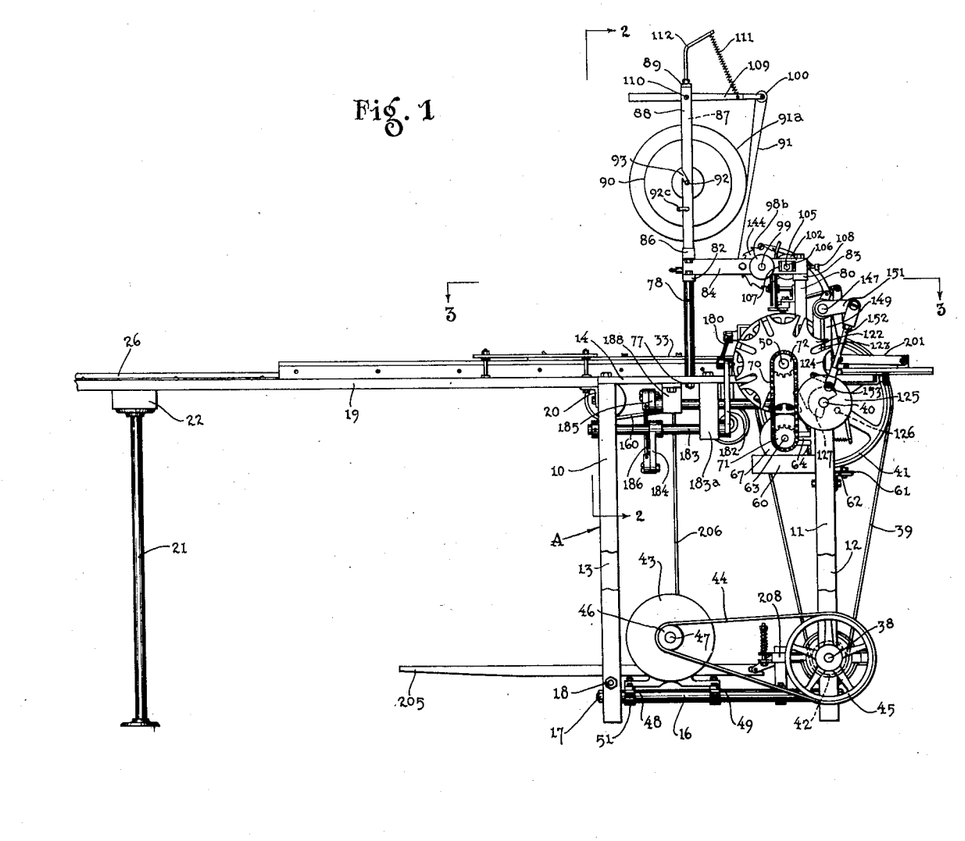
Fig. 1 is a side elevational view of a banding machine illustrating an embodiment of my invention in such machines.
Figure 2:
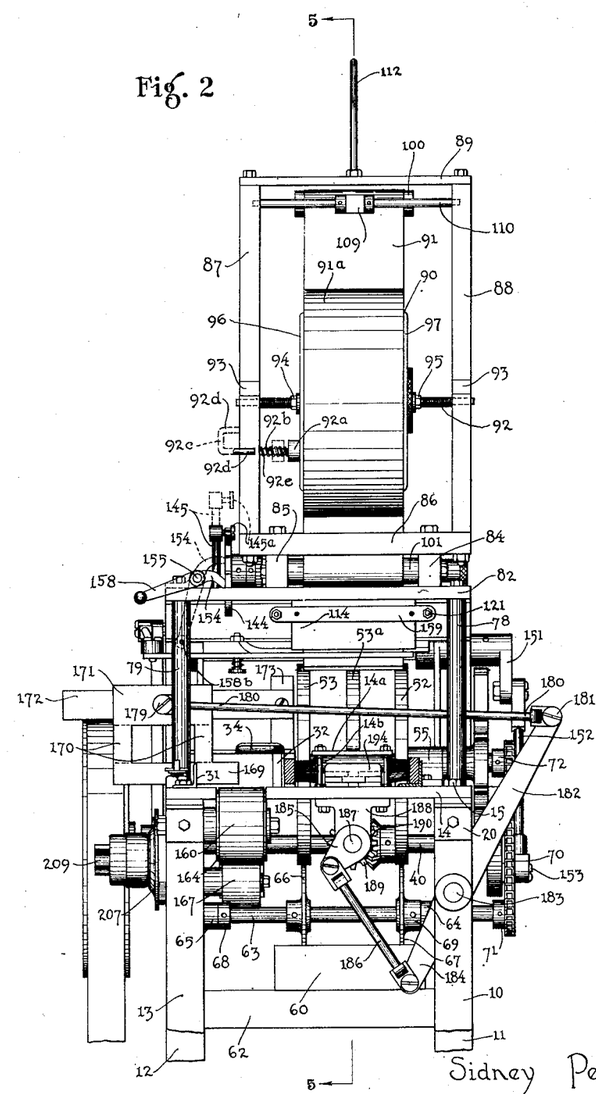
Fig. 2 is a fragmentary sectional view of the structure shown in Fig. 1, taken as on the line 2—2 and drawn to a somewhat enlarged scale.

The bands used for banding the packages are constructed from a ribbon 91 of paper or other suitable material of a width equal to the desired length of the band, by shearing off strips from the leading end of the ribbon, as the machine operates. The construction for accommodating the ribbon supply is best illustrated in Figs. 1 and 2. To the table 14 are rigidly bolted, through bolts 77, four uprights 78, 79, 80 and 81. The uprights 78 and 79 have attached to the upper portions thereof a cross bar 82 while the uprights 80 and 81 have similarly attached to them a cross bar 83. To these cross bars are secured two longitudinal cross bars 84 and 85. Traversing corresponding ends of the two bars 84 and 85 is another cross bar 86 which carries two standards 87 and 88 connected at their extreme upper ends through a tie bar 89. The standards 87 and 88 form a support for a reel, indicated in its entirety at 90, for a roll 91ª of the ribbon 91 from which the bands are to be formed. This reel comprises a shaft 92 which is removably journalled at its ends in downwardly inclined notches 93 in the uprights 87 and 88. This reel shaft 92 is threaded intermediate its ends to receive two nuts 94 and 95 which clamp two plates 96 and 97 against the opposite sides of the roll 91ª. Releasably, yieldingly thrust against the face of plate 96 is a friction head 92ª, the same being mounted on a stem 92ᵇ slidably projecting through the upright 87 and formed with two bends, one providing an arm 92ᶜ and the other an abutment 92ᵈ. In the normal position of stem 92ᵇ, the abutment over-reaches one side of the upright 87, a compression spring 92ᵉ, encircling the shank of the stem and interposed between the friction head 92ª and upright 87, operating in such relation of the abutment 92ᵈ to force the head 92ª against the plate 96. In reloading the reel with a new rolled ribbon, the friction head 92ª is retracted from the plate 96 against the action of the spring 92ᵉ and the abutment 92ᵈ is turned with its extremity to bear against the outer face of upright 87 and thus hold said head 92ª retracted.

For the purpose of feeding the paper to the banding mechanism, a feed roll 98 is employed (Fig. 5), said roll being mounted on a shaft 99 journalled in the bars 84 and 85. The ribbon 91, leaving the roll 91ª, passes over a tensioning roll 100 and beneath an idler guiding roll 101 disposed immediately in advance of the feed roll 98. The paper then passes over the feed roll 98 and between it and a cushioned friction roll 102, by means of which sufficient friction may be had between the ribbon 91 and the roll 98 to cause the rotation of the said roll to feed the paper in the desired manner. The friction roll 102, which is considerably shorter than the feed roll 98, has a covering 104 such as rubber or the like and is mounted on a shaft 105 (Fig. 1), the ends of said shaft being journalled in bearing blocks 106 slidably positioned in suitable slots 107 in the longitudinal bars 84 and 85. A gear 98ª, fast to the feed roll shaft 99, meshes with a gear 102ª fast to said shaft 105, and causes the friction roll 102 to turn in a direction opposite to that of the feed roll 98, but at the same peripheral speed. Said bearing blocks 106 may be advanced along the slots 107 by means of adjusting screws 108 to give any degree of friction to the ribbon, as may be required. By means of this construction, the ribbon is unwound from roll 91ª and fed downwardly between the feed roll 98 and friction roll 102. For conveniently turning the rolls 98 and 102 by hand as in threading the ribbon, a knob 98ᵇ (Fig. 1) is fastened to the shaft 99.

The tensioning roll 100 is journalled in a swinging arm 109 pivoted on a shaft 110 supported at the upper portions of the standards 88 and 87. This arm 109 is caused to elevate the tensioning roll 100 through a tension coil spring 111 secured at one end to said arm in proximity to the roll 100 and at its other end to an upstanding arm 112 secured to the cross bar 89. By means of this device, sufficient tension may be exerted through the spring 111 upon the ribbon leaving the roll 91ª so that the ribbon is at all times maintained without slack and under proper tension to be handled effectively in the formation of the bands, as will be presently described.

Figures 6, 7, 8:
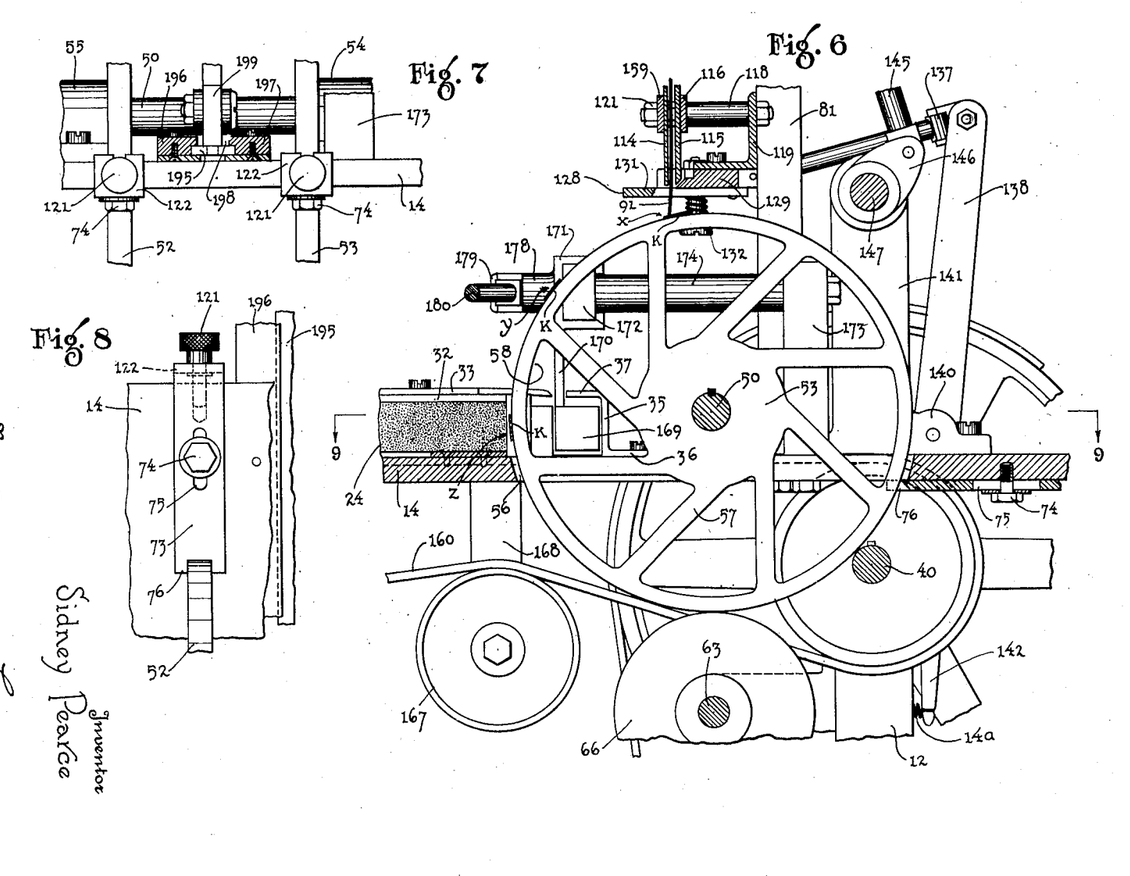
Fig. 6 is a fragmentary longitudinal sectional view taken as on the line 6—6 of Fig. 3 and illustrating in enlarged detail some of the parts shown in Fig. 5.
Fig. 7 is a fragmentary elevational sectional view taken on line 7—7 of Fig. 3 and being somewhat enlarged.
Fig. 8 is an inverted view of a part of the structure shown in Fig. 7.

The ribbon 91 upon leaving the paired rolls 102 and 98, passes downwardly through a guide, indicated in its entirety at 113 (Figs. 3, 5 and 6). This guide comprises a plate 114 and three spaced fingers 115, which are secured to a cross bar 116. The plate 114 is similarly secured to a cross bar 159 and the said cross bars are mounted upon two rods 117 and 118 bolted to an angle cross frame member 119 secured to the posts 80 and 81 through bolts 130. The bars 159 and 116 are held in spaced relation by means of nuts 120 and are clamped to the said rods 117 and 118 through nuts 121 threaded on said rods. By means of this construction, the ribbon 91 may be guided downwardly in a manner to give full control of the same in the forming of the bands therefrom. In this connection, it will be noted that the extended upper portions of the outer bars 115 occupy positions at opposite ends of the short roll 102, the upper extremities of said portions standing appreciably above said roll 102 and turned back slightly to form guides to direct the ribbon 91 between rolls 98 and 102 as the operator threads the machine.

The gumming wheels 52 and 53, previously referred to, are driven from the shaft 40 through a Geneva movement, best shown in Fig. 1. This movement comprises a disc 122 constructed with a series of radial slots 123 and intervening arcuate portions 124. A flange 125 fast on the shaft 40 is provided with a pin 126 and with a semi-circular hub 127. Upon each revolution of shaft 40, the pin 126 engages with one of the slots 123 turning the shaft 50 a partial revolution. When the pin 126 leaves a slot 123, the hub 127 engages the adjacent arcuate portion 124 of the disc 122 and holds the same locked. In this manner, the shaft 50 is given a step by step turning movement, being actuated during a portion of each revolution of the shaft 40 and securely held during another portion thereof.

Figure 4:
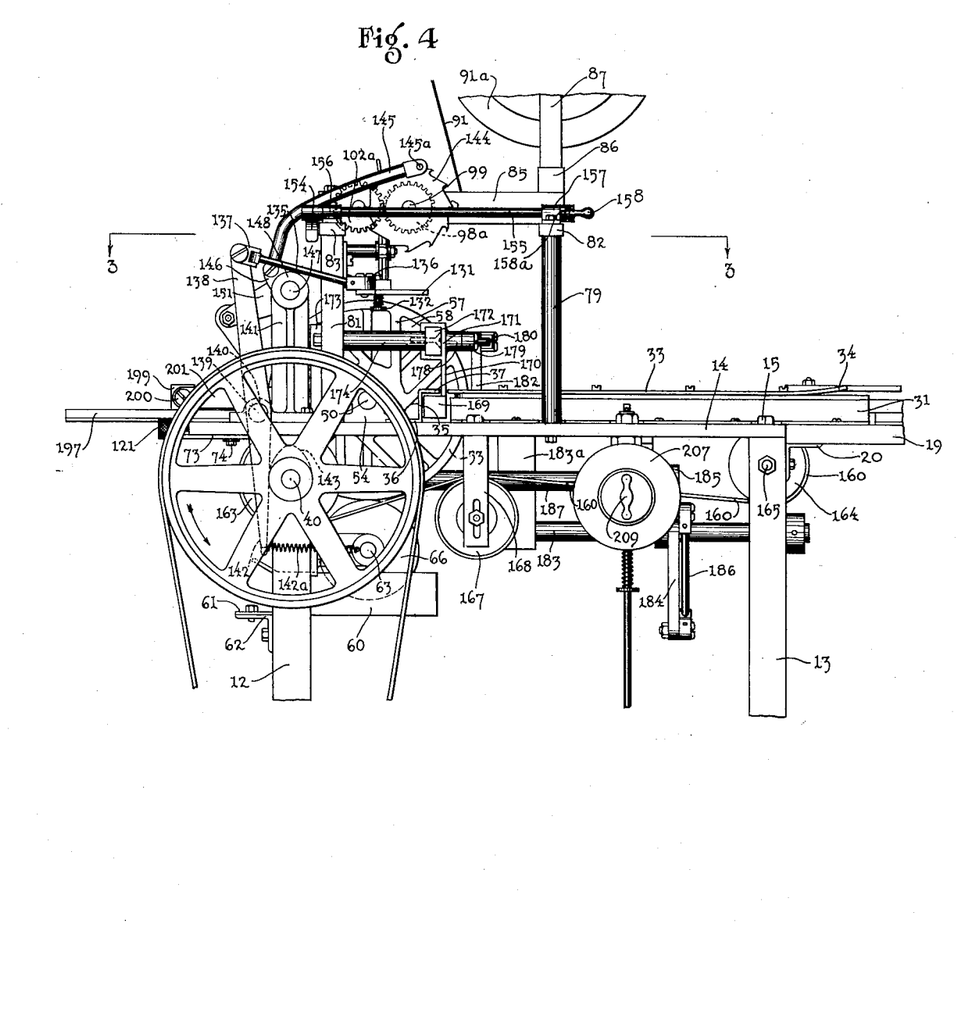

Strips of appropriate width are cut off from the leading end of the ribbon 91 to form the bands, such strips being severed by means of a shear indicated in its entirety at 128 (Figs. 1, 4, 5 and 6). This shear includes a fixed shear blade 129 secured to the angle frame member 119 and cooperating with a movable shear blade 131 pivotally connected through a bolt 132 with a projection 133 formed on the said fixed shear blade. An actuating arm 134 extending from the shear blade 131 is pivotally connected to a link 135 through a universal joint 136 (Figs. 3 and 4). The link 135 is in turn connected through another universal joint 137 with a rocker arm 138 pivoted on a stud 139 which is secured to a boss 140 formed on a casting 141 attached to the table 14. The rocker arm 138 is constructed with a depending extension which is kept engaged with a cam 143 on shaft 40 by means of a spring 142$^a$. As said shaft 40 rotates, this cam 143 and spring 142$^a$ swing the blade 131 of the shear from open into closed position and back to sever the end of a strip from the ribbon 91 fed between the two shear blades 129 and 131.

For feeding the ribbon 91 through the guide 113 and the shear blades in a step by step manner, a ratchet wheel 144 is employed, the same being attached to the feed roll shaft 99. This ratchet wheel is adapted to be moved intermittently through a pawl 145 pivoted to an arm 146. The arm 146 is mounted upon a rock-shaft 147 disposed above the table 14 and parallel with the shafts 40 and 50. Said rock-shaft 147 is journalled in a bearing 148 formed on the upright or casting 141 previously referred to and in a similar bearing 150 formed on a second casting 149 also secured to the table 14. The weight of the pawl 145 causes a ratchet engaging pintle 145$^a$ at the free end thereof to engage the teeth of the ratchet wheel 144 and, upon actuation of the shaft 147, the shaft 99 is given a step by step movement intermittently feeding the ribbon through the guide 113 so as to advance the ribbon a distance equal to the width of the bands to be formed therefrom.

The shaft 147 is rocked by means of a crank 151 secured thereto. This crank is connected through an adjustable link 152 with a pin 153 eccentrically mounted on the flange 125 forming a part of the Geneva movement previously referred to. The arm formed by the said flange and pin is considerably shorter than the arm 151 so that a rocking movement is given the shaft 147 as the shaft 40 rotates.

To permit of throwing the pawl 145 out of engagement with the ratchet wheel 144, I employ a finger 154 (Figs. 2 and 4) which is attached to a longitudinally disposed shaft 155. This shaft is journalled in bearings 156 and 157 secured to the two cross bars 83 and 82 of the frame structure. A handle 158 secured to the end of this shaft serves to turn the same and to cause the finger 154 to elevate the said pawl 145 (dotted lines, Fig. 2) whenever desired. A spring pressed pin 158$^a$ (Fig. 4), projecting from handle 158, engages in a depression 158$^b$ in post 79 and yieldingly secures the handle 158 in position causing the finger 154 to remain elevated and thus render pawl 145 inoperative.

The packages to be banded are moved through the guideway 23, along table 14 and toward the stop 35 by means of an endless belt 160 arranged with the upper run thereof (Fig. 3) disposed within a slot 162 cut in the table 14 along the center of the said guideway 23. This belt 160 passes over a pulley 163 attached to the shaft 40 and over another pulley 164 rotatably mounted upon a stub-shaft 165 secured to the leg 13 of the frame structure. A belt tightener comprising an idler 167 is mounted on a bracket 168 secured to the underside of the table 14. This belt tightener provides the proper tension in the belt 160 and guides the lower run thereof. The upper run of this belt 160 lies slightly above the level of the table 14 so as to receive and support the packages as they encounter the belt in being moved along in a train through the head of guideway 23. In being pushed upon the belt 160, the said packages are advanced thereby toward the stop 35. The belt 160, being driven from the shaft 40, travels continuously and during such time as the train of packages is held stationary by the stop 35, the belt slips beneath the packages. As soon as the package adjacent stop 35 is removed, the belt 160 automatically advances the train, bringing the next package up to the said stop where the banding apparatus may act upon it as will be presently described.

As previously stated, the packages are removed from their position adjacent the stop 35 and projected between the spokes 57 of the wheel 53 and into a position between the two wheels 52 and 53 where they are banded and delivered to the discharge guide 24. For so moving the packages, a plunger 169 (Figs. 2 and 4) is utilized. This plunger is in a cross section approximately equal to the cross section of the package which is to be ejected from the train of packages in the guideway 23. Said plunger 169 is connected with arms 170 depending from a guide 171 reciprocable along a horizontally disposed track or bar 172. This bar is secured to the upright 81 and to a similar upright 173, mounted on the table 14, through two studs 174 and 175 issuing outwardly therefrom.

The plunger 169 is reciprocated by mechanism now to be described. Issuing from the guide 171 (Fig. 3) is a boss 178 which has pivoted to it, through a screw 179, a link 180. This link is in turn pivoted to the end of a lever 182 which is attached to a longitudinally disposed shaft 183 (Fig. 1), said shaft being journalled in the leg 10 of the frame structure and in a bracket 183$^a$ secured to the underside of the table 14. The shaft 183 has keyed to it a depending arm 184 and is rocked by said arm through another arm 185 (Fig. 2) connected thereto by a link 186. Said arm 185 is secured to a shaft 187 journalled in bearings 188 attached to the underside of the table 14. The shaft 187 has mounted on it a bevel gear 189 which meshes with a corresponding bevel gear 190 fast on shaft 40. Upon each rotation of the shaft 40, the shaft 187 is given a complete rotation, moving the arm 185 through a complete circle. The arm 185 is considerably shorter than the arm 184 so that a rocking movement is given to the shaft 183 while the shaft 187 makes a complete revolution. With this construction, the plunger 169 is moved back and forth along the bar 172, causing the inner end of said plunger to engage the end of the foremost package in the guideway 23 and move it out of said guideway, between the spokes 57 of the wheel 53, into position between the two wheels 52 and 53 and against a stop 192 (Fig. 9) mounted upon the table 14 adjacent the wheel 52. The plunger 169 is of a length considerably greater than the width of the guideway 23, and serves temporarily as a stop to hold back the advancing train of packages in guideway 23 until said plunger is returned to starting position.

The bands, cut from the ribbon 91 by the shear 128 (Fig. 6), take position upon and are initially supported by the wheels 52 and 53 at the tops thereof. As the wheels 52 and 53 rotate through the Geneva movement, the bands are moved from such elevated receiving position as at $x$, to an intermediate position of dwell, as at $y$, and thence to the ultimate position for presentation, as at $z$, transversely of the head of the guideway 24, between the rear-most package of the train in said guideway and the package last inserted by the plunger 169 into the space between the two wheels 52 and 53. This latter package is thereafter thrust against the positioned band, in a direction away from the peripheries of the wheels 52 and 53, into the guideway 24, which consists of two spaced brushes 27 and 28 suitably secured on the table 14, the bristles 29 of one brush facing the bristles 30 of the other brush. The thrusting of a package between the wheels 52 and 53 and against a positioned band (position $z$, Fig. 6) and through that position into the guideway 24 has several results which are advantageous to the operation of the machine in that the contents $h$ of the open package is caused to be seated in the tray or boat $g$; in that the band is taken from the wheels 52 and 53 by the package itself (Fig. 10); in that the band is secured in proper position with respect to its particular package by being caught between it and the next preceding package before control of the band is lost by the ultimate detachment of its ends from the wheels 52 and 53 and in that the gummed extremities of the released band are turned back upon the ends of the package and thence sealed thereagainst by members of the delivery guideway, while the contents of the package remain seated under pressure in the tray. For the purpose of thrusting the packages from between the wheels 52 and 53, as above described, a plunger 194 is employed which is in the nature of a plate of approximately the same dimensions as the bottom of the package to be banded. This plunger is formed by bending up the end of a bar 195 (Fig. 5) which is slidably mounted in two spaced guides 196 and 197 secured to the top of the table 14 at its rearward portion and in alignment with the center of the guide 24. A block 199 riveted to the end of the bar 194 plays in a slot 198 between the guides 196 and 197 and has pivoted to it, through a bolt 200, a pair of spaced links 201 which straddle said block and extend forwardly thereof substantially parallel with the guides 196 and 197. These links are pivotally connected through a bolt 202 with the lower end of an arm 203 depending from the rock-shaft 147. As this shaft is rocked through the action of the crank 151 and the link 152, the plunger 194 is reciprocated in a longitudinal direction, the forward thrust thereof moving a package from between the wheels 52 and 53 against the positioned band so as to affix the same to the package and deliver the banded package to the guide 24.

A plate 14$^a$ (Figs. 2 and 5) supported above the table 14 by studs 14$^b$ extending upwardly from the table closely overreaches the position occupied by a package between the wheels 52 and 53, said plates serving to insure the seating of the packages against the face of the table as they are introduced between said wheels by plunger 169 and as they are thrust from that position by plunger head 194.

It has been explained that strips from the leading end of the ribbon 91 are severed by the shear 128 to provide the bands $k$ which are taken by the wheels 52 and 53 into position at the head of guideway 24. Particular attention is invited to this feature, which may be more readily understood from the illustration shown in Fig. 6. Here it will be seen that ribbon 91 is advanced far enough to bring its leading edge into engagement with the forward margin of the band previously cut and deposited on the wheels 52 and 53 with the ends of the band lying upon the peripheral surfaces of said wheels. This engagement of the ribbon 91 with the previously cut band, first occurring during the dwell of the wheels 52 and 53, initially presses the band against freshly gummed upper portions of said wheels. As these wheels start to turn, in making their next step, the end of ribbon 91 continues to engage the band and lightly, though effectively, brushes the moving band against the wheels. During the completion and at the termination of such step of the wheels 52 and 53, the end of the ribbon 91 has contact with the gummed peripheral surfaces of said wheels so that the next band to be cut from the ribbon will be under control before the shearing operation takes place. At the time of such shearing operation, the portion of the ribbon being severed is slightly inclined with the result that the severed band, urged by the rearwardly swinging shear blade 131, tips back on its previously engaged forward edge, thus flattening out with certainty upon the peripheral surfaces of the wheels 52 and 53. To prevent the appreciable bowing of a band in this flattened condition and during its transit into a substantially edgewise position, I provide a curved guard 53ª between the wheels 52 and 53, said guard being anchored at its lower end to the capping plate 14ª beneath which a package is pushed by the plunger 169.

Figure 9:
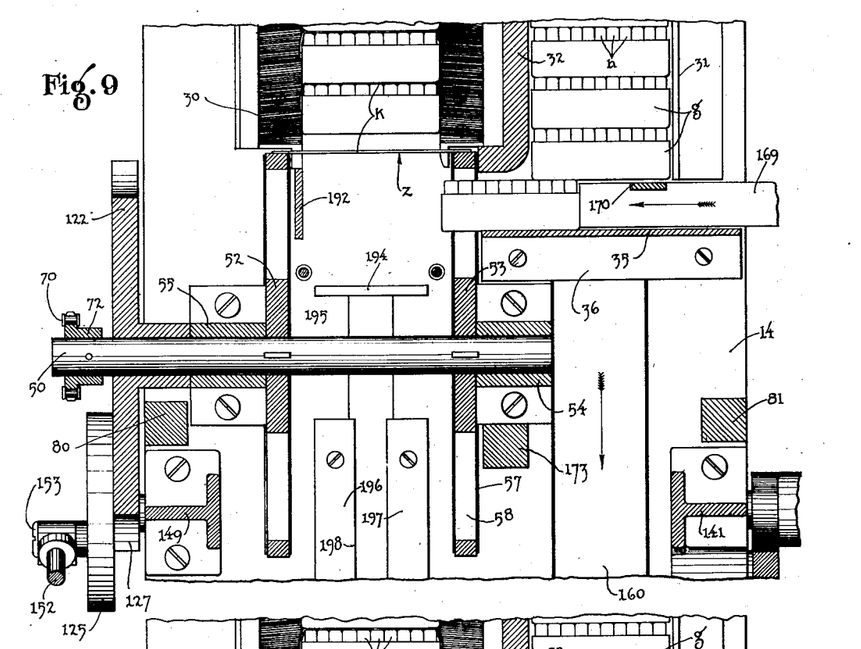
Fig. 9 is a fragmentary sectional view somewhat enlarged and taken as on the line 9—9 of Fig. 6 to illustrate the operation of the machine.
Figure 10:
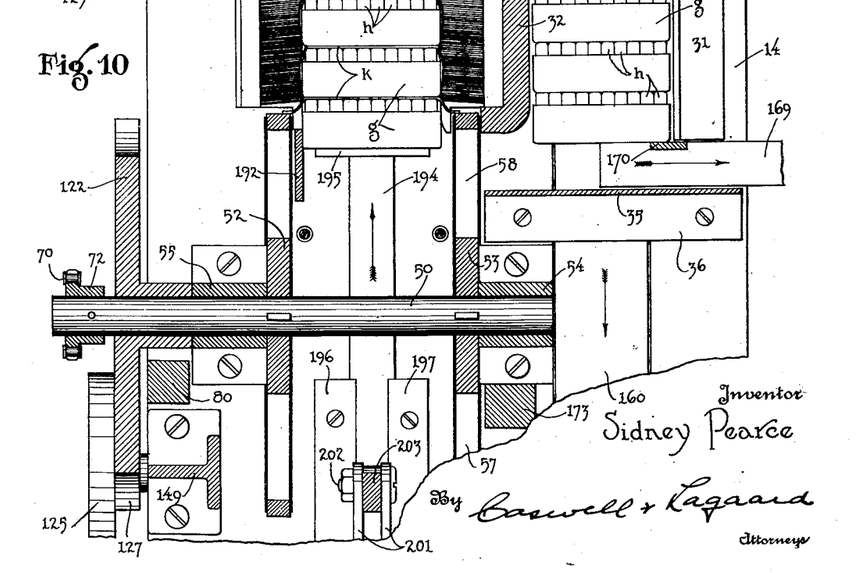
Fig. 10 is a view similar to Fig. 9 showing the parts in altered relation.

In operating the device, the packages are either manually or automatically fed, in train, into the guideway 23. When they reach the table 14, the belt 116 carries the packages along the guideway planting the leading package against the stop 35. From such position, the plunger 169 thrusts the packages endwise through the spokes 57 of wheel 53, into the space between the wheels 52 and 53, against the stop 192. The movement of the package through the spokes of the wheel 53 is illustrated in Fig. 9. While this movement is taking place, the plunger 194 is withdrawn, as shown in Fig. 9, to leave the space between the said wheels free for the reception of the unbanded package. The operations of the plungers 169 and 194 are so timed that, when the plunger 169 recedes from the wheel 53, after thrusting a package between its spokes 57, the plunger 194 engages the package, thrusting it along to effect the banding thereof. As the package is thrust by the plunger 194, its forward side engages the band in position z and frees the ends of the band from the gummed surfaces of the supporting wheels 52 and 53. Upon further movement of the plunger 194, the freed ends of the band are brought into contact with the brushes 29 and 30 which turn the ends upon the package and cause them to be sealed to the ends of the package. The stroke of the plunger 194 is sufficient to thrust the banded package well beyond said position z to be taken by the next band. The relative positioning of parts in the act of banding a package is clearly shown in Fig. 10, the brushes 29 and 30 having commenced turning back the ends of the band, the extremities of which are slidably clinging to the gummed surfaces of the wheels 52 and 53 as they are being detached therefrom. While the banding of a package takes place, a new band is being formed and deposited upon the upper surface of the two wheels 52 and 53. After the completion of a banding operation and as the plunger 194 recedes, the Geneva movement operates to move the wheels 52 and 53 through another step.

If desired, heating means may be placed along the guide 24 to hasten the setting of the adhesive. Such means are diagrammatically indicated in Fig. 5 at 204, it being readily comprehended that a plate, as shown, may be readily heated by an electrical coil or other suitable heating device.

To facilitate rapid starting and stopping of the machine, a foot lever, such as shown in Fig. 1 at 205, may be utilized. This lever is connected through a rod 206 with a switch 207 controlling the electric motor 43. The lever 205 also operates a brake mechanism 208 connected with the shaft 38 so that, as the switch 207 is disconnected, the rotation of the shaft 38 may be simultaneously arrested. A switch knob 209 utilized in conjunction with the system serves to turn the motor 43 off and on in addition to the lever 205 so that the motor may be permanently disconnected when not in use.

Although I have specified the use of an adhesive in conjunction with the wheels 52 and 53, it can be readily comprehended that the bands may be previously gummed and the same merely moistened with water applied to the said wheels. It is also to be understood that gum or adhesive referred to in this specification includes any suitable substance for causing the bands to adhere to the packages, such as silicate of soda, glue, casein products and the like.

The invention is advantageous in that the device is positive in action and highly effective to produce the desired results. The bands are given a moment in which to absorb the adhesive from the applying device while moving from one position to the other. A slight pressure is applied to the formed band by the end of the ribbon causing the band to properly receive the adhesive and to adhere to the adhesive wheels. The two guides for the banded and unbanded packages, extending in the same direction, minimize the length of the machine. The machine is readily under the control of the operator at all times. A minimum amount of paper and adhesive is employed so that the packages may be banded at a trifling cost. In addition to the foregoing and other advantages of the invention is the important advantage of control. That is to say, the invention provides for control of the packages, control of the contents in the packages and control of the bands in the formative stage thereof, in their application to the gumming wheels, in the presentation thereof by said wheels, and in the planting of the bands against and in the sealing thereof to the packages.

Changes in the specific form of my invention, as herein disclosed, may be made within the scope of what is claimed without departing from the spirit of my invention.

Having described my invention, what I claim as new and desire to protect by Letters Patent is:

1. A package banding machine comprising a pair of spaced wheels for peripherally supporting a band, one of said wheels having an opening therethrough, means for feeding packages in succession to a position adjacent said opening, means for moving a package thus positioned through said opening and into a position between said wheels, and means for thereafter moving the package between said wheels into engagement with the band, and means for affixing the band to the package.

2. A package banding machine comprising a pair of spaced wheels, one of said wheels having an opening therethrough, means for applying an adhesive to the peripheral surfaces of said wheels, means for feeding bands upon said wheels, a guide for packages positioned adjacent the wheel having the opening therethrough, means for moving the packages along said guide, a stop for terminating the movement of said packages at said opening, a plunger for shifting the packages in succession from said guide and through said opening, and means for moving a shifted package into engagement with a band on said wheels, and means for affixing the band to the package.

3. A banding machine comprising a pair of spaced wheels, means for applying an adhesive to the peripheral surfaces of said wheels, a ribbon feeding device positioned above said wheels, a shear for severing the leading portion of said ribbon to form individual bands, said shear operating in a direction toward said wheels to move the sheared bands into engagement with the wheels, and means between said wheels for removing the bands therefrom and affixing the same to the packages to be banded.

4. A banding machine comprising a pair of spaced wheels, means for gumming the peripheral surfaces of said wheels, a ribbon positioned above the wheels, a shear adapted to sever individual bands from said ribbon and deposit them on said surfaces of said wheels, means for imparting to the wheels a step by step movement, means for feeding the ribbon into engagement with the previously severed band to cause the same to brush the band against the gummed surface of said wheels upon rotation thereof, and means between said wheels for removing the bands therefrom and affixing the same to the packages to be banded.

5. A banding machine comprising a pair of spaced wheels, means for applying an adhesive to the peripheral surfaces of said wheels, a ribbon positioned above said wheels, means for feeding said ribbon downwardly upon said wheels forwardly thereof to bring the leading end of the ribbon into contact with the adhesive on said wheels, a shear for severing said end of the ribbon to form a band, said ribbon feeding device being thereafter operable to feed the then leading portion of the ribbon against the severed band to force the same into contact with the surfaces of said wheels, means for thereafter imparting to the wheels a partial rotation to cause said leading portion of the ribbon to brush along the severed band and thereby insure the application of the adhesive to the ends of the band during the movement of said wheels, and means for removing the bands from the wheels and affixing the same to the packages to be banded.

6. In a machine of the character described, spaced members movable in unison from a band receiving position to a band presenting position, means for coating said members with an adhesive, band supplying means adapted to feed bands bringing the end portions thereof into contact with said members at said first position thereof, the coating on the members causing a fed band to adhere thereto and in turn to be supplied at its end portions with adhesive, said band supplying means including a ribbon, mechanism for directing the ribbon end foremost against the band previously fed to said members, and a shearing device for cutting off the leading portion of the ribbon, said ribbon, prior to its severance, serving to brush the previously fed band against the coated members, said members being adapted to carry the band into said second position, means for moving a package to be banded between said members and through said second position to cause the package to strip the band from said members, and means for turning the adhesive treated end portions of the band upon the moving package and brushing them in place thereon.

7. In a machine of the character described, a movable member, means for coating said member with an adhesive, band supplying means adapted to feed bands into contact with said member, the coating on the member causing a fed band to adhere thereto and in turn to be supplied with adhesive, said band supplying means including a ribbon, mechanism for directing the ribbon end foremost against the previously fed band, and a shearing device for cutting off the leading portion of the ribbon, said ribbon, prior to its severance, serving to brush the previously fed band against the coated member, said member being adapted to carry a band from band receiving position to a band presenting position, means for moving a package to be banded through said second position to cause the package to strip the band from said member, and means for holding the adhesive treated band with respect to the package and brushing it upon the package.

8. In a machine of the character described, a movable member, means for coating said member with an adhesive, band supplying means adapted to feed bands into contact with said member, the coating on the member causing a fed band to adhere thereto and in turn to be supplied with adhesive, said band supplying means including a ribbon, mechanism for directing the ribbon leading edge foremost against a previously fed band, and a shearing device for cutting off the leading portion of the ribbon, said ribbon, prior to its severance, serving to brush the previously fed band against the coated member.

9. The method of banding packages open at one side with the contents projecting therefrom, said method consisting in successively presenting gummed bands in a given position, moving the packages on their sides, in train, to retain the contents in the packages, successively shifting the packages from said train and bringing them, contents foremost, adjacent the presented bands, and thrusting the packages through said given position and beyond, in another train, and in turning the ends of the bands upon their respective packages as they join the second train, and in further sealing said ends against the packages in said second train.

10. A package banding machine comprising a frame, a rotary structure journaled thereon and formed with separated portions having peripheral surfaces and providing a space therebetween having a peripheral opening, means for coating the peripheral surfaces of said separated portions with an adhesive, means for applying a band to the coated surfaces of said separated portions, a fixed support for a package to be banded, attached to said frame and extending through the peripheral opening and into said space, means for delivering packages upon said support, means for rotating said rotary structure to bring a band attached thereto opposite a package mounted upon said support and means for applying the band to the package.

11. A package banding machine comprising a frame, a rotary structure journaled thereon and formed with separated portions having peripheral surfaces and providing a space therebetween having a peripheral opening, means for coating the peripheral surfaces of said separated portions with an adhesive, means for applying a band to the coated surfaces of said separated portions, a fixed support for a package to be banded, attached to said frame and extending through the peripheral opening and into said space, means for delivering packages upon said support, means for rotating said rotary structure to bring a band attached thereto opposite a package mounted upon said support, means for applying the band to the package and a member for moving the package into engagement with said band, said member extending through said peripheral opening.

12. A package banding machine comprising a guide for guiding packages for movement in a given direction, a second guide disposed in parallel relation along said first named guide for guiding the packages for movement in the opposite direction, means for shifting the packages in succession from said first guide to said second guide and means for thereafter applying a band to each package in its course of movement along said second guide.

13. A package banding machine comprising a rotary structure formed with peripheral surfaces and providing a space within the same having a peripheral opening, means for coating the peripheral surfaces of said rotary structure with an adhesive, means for applying a band to the coated surfaces of said rotary structure, means for moving a package to be banded longitudinally into the space within said rotary structure and means for moving said package radially and in a horizontal direction outwardly through said peripheral opening into engagement with the band and means for affixing the band to the package.

14. A package banding machine comprising a rotary structure formed with peripheral surfaces and providing a space within the same having a peripheral opening, means for coating the peripheral surfaces of said rotary structure with an adhesive, means for applying a band to the coated surfaces of said rotary structure, means for moving a package to be banded longitudinally into said space within said rotary structure, means for moving said package radially and in a horizontal direction outwardly through said peripheral opening into engagement with the band, means for applying the band to the package and an elongated guide for receiving the banded packages, said guide having means throughout a portion thereof for maintaining pressure upon the applied band to hold the same in place during the setting of the adhesive thereon.

15. In combination, a movable member, means for coating said member with an adhesive, means for directing the leading edge of a band ribbon against the coated surface of said movable member and a shearing device for cutting off the leading portion of the ribbon for forming a band therefrom, said shearing device operating in a direction toward said movable member to move the sheared band into further engagement with the coated surface and means for affixing the coated band to a package to be banded.

16. In combination, a rotary structure having a peripheral surface, means for coating the peripheral surface of said rotary structure with an adhesive, a ribbon feeding device for directing the leading edge of the ribbon in a substantially radial direction against said peripheral surface and means for subsequently directing the severed edge of the band formed from the ribbon against said surface.

In testimony whereof I have affixed my signature to this specification.

SIDNEY PEARCE.